United States Patent [19]

Ogiro et al.

[11] Patent Number: 4,485,989
[45] Date of Patent: Dec. 4, 1984

[54] RECORDING TAPE CASSETTE

[75] Inventors: Kenji Ogiro, Kanagawa; Shinichi Gotoh, Kyoto, both of Japan

[73] Assignees: Hitachi Maxell, Ltd., Osaka; Hitachi, Ltd., Tokyo, both of Japan

[21] Appl. No.: 473,754

[22] Filed: Mar. 9, 1983

[30] Foreign Application Priority Data

Mar. 10, 1982 [JP] Japan .................. 57-34263[U]
Feb. 23, 1983 [JP] Japan .................. 58-26434[U]

[51] Int. Cl.³ .................. G03B 1/04; G11B 15/32; G11B 23/04
[52] U.S. Cl. .................. 242/198; 220/334
[58] Field of Search .................. 242/197-200; 220/326, 339, 334; 360/132, 137, 85, 95; 352/72, 78

[56] References Cited

U.S. PATENT DOCUMENTS

| 3,809,219 | 5/1974 | Esashi | 220/326 |
| 3,900,172 | 8/1975 | Kamaya | 242/198 |
| 3,950,787 | 4/1976 | Hosaka | 360/137 |
| 3,980,255 | 9/1976 | Serizawa | 242/198 |
| 4,323,207 | 4/1982 | Gebeke | 242/198 |

Primary Examiner—Leonard D. Christian
Attorney, Agent, or Firm—Birch, Stewart, Kolasch & Birch

[57] ABSTRACT

A recording tape cartridge which comprises a lid member mounted on a cartridge case to rotate between a closed position and an opened position, clearance means defined in one corner of the cartridge case and a lid locking means provided in the clearance means for locking the lid member in the closed position. The lateral width of the clearance means is wider in its front portion than that in its rear portion.

1 Claim, 4 Drawing Figures

RECORDING TAPE CASSETTE

FIELD OF THE INVENTION

The present invention relates to a recording tape cartridge which has a front lid member pivotally mounted on the front surface of the cartridge case for protecting a recording tape accommodated therein, adapted so as to smoothly and reliably release the front lid member which is locked in a closed position.

BACKGROUND OF THE INVENTION

In a video tape cartridge such as that shown in FIG. 1, a cartridge case 1 is provided in its front surface with a tape-protecting front lid member 10 which is locked in a closed position when the tape cartridge is not used for covering and protecting the recording surface of the video tape 2 extending along the front surface of the cartridge case 1. Between one of side walls 15 of the cartridge case 1 and one of the connecting members 12 of the front lid member 10, which is opposed to one of the side walls 15, there is defined a clearance 20 for containing a locking member. The locking member functions to lock the front lid member 10 in a closed position in such a manner that, when the video tape cartridge is mounted in a video tape recorder, a locking release member 27 provided in the video tape recorder (not shown) is inserted in the clearance 20 from the front side of the cartridge case 1 to be engaged with the locking member contained in the same, thereby releasing the front lid member 10 from the locked position.

However, since the clearance 20 is defined in a limited space between the side wall 15 of the cartridge case 1 and the connecting member 12 of the front lid member 10 and is extremely narrow in width, it is rather difficult to insert the locking release member 27 in the clearance 20. Particularly when the video tape cartridge is mounted in the video tape recorder in a condition slightly deviating in either a right or left direction, the locking release member 27 cannot be inserted into the clearance 20. Such inconvenience frequently arises as the video tape cartridge is made small in size with the clearance 20 being narrowed in width.

SUMMARY OF THE INVENTION

In consideration of the aforementioned disadvantage, it is an essential object of the present invention to provide an improved recording tape cartridge in which a locking release member provided in a recording/reproducing apparatus can be smoothly and easily inserted into a clearance formed in the cartridge case for facilitating releasing of the locking of a front lid member for covering the front surface of the cartridge case.

DESCRIPTION OF THE PREFERRED EMBODIMENT

Figure 1:
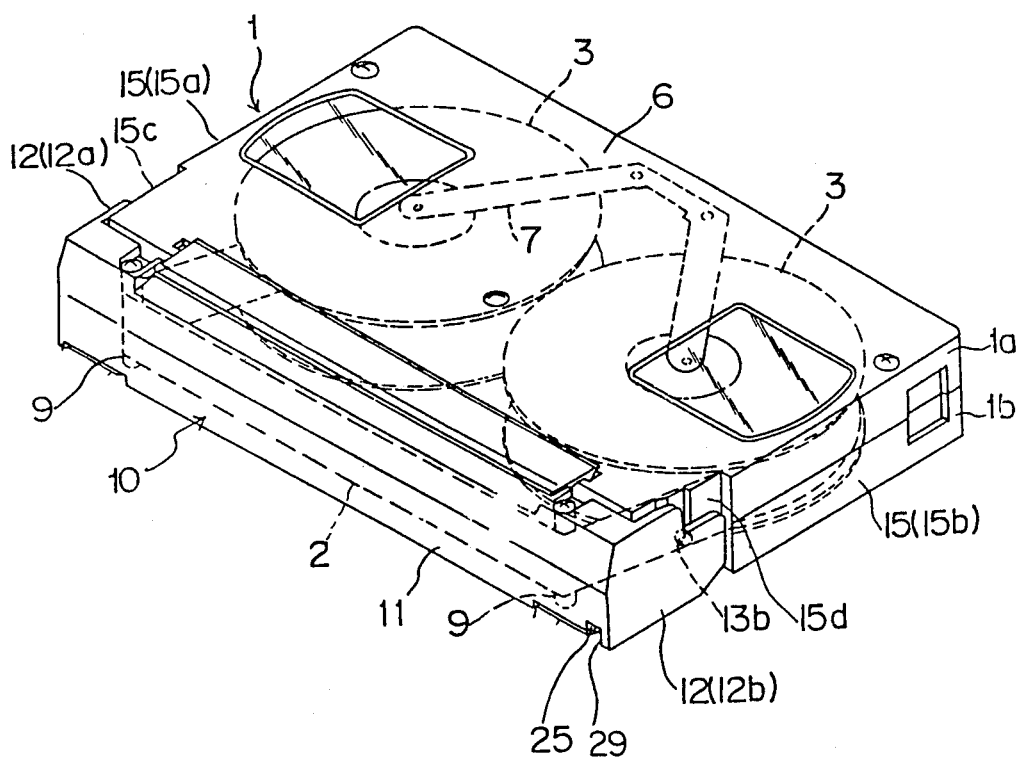
FIG. 1 is a perspective view of an embodiment of a recording tape cartridge according to the present invention.
Figure 2:
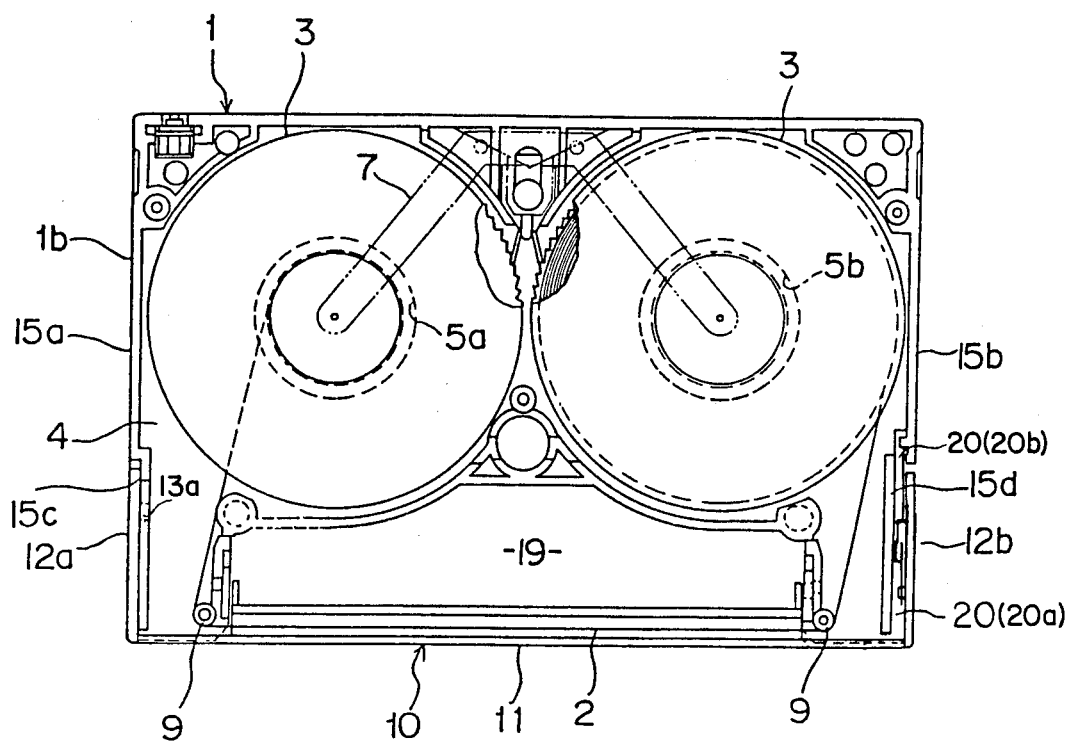
FIG. 2 is a top plan view of the video tape cartridge showing the internal construction thereof.
Figure 3:
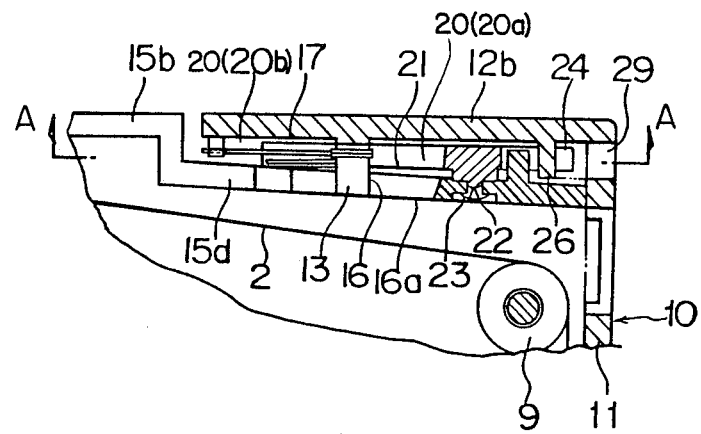
FIG. 3 is a partially enlarged top plan view showing essential portions of a locking member.

Referring to FIGS. 1 and 3 of the drawings, there is shown a recording tape cartridge according to the present invention, which comprises a cartridge case 1 consisting of a top section 1a and a bottom section 1b formed of plastic resin material and connected with each other by screws in a butting manner. Within the cartridge case 1, there are provided a pair of tape reels 3 for winding a video tape 2 for recording and/or reproducing video signals. The tape reels 3 are downwardly pressed at their centers of rotation by a spring plate 7 which is secured to the inner surface of an upper wall member 6 of the cartridge case 1 in positions opposite to a pair of driving shaft insertion holes 5a and 5b defined through a bottom wall member 4 of the cartridge case 1, so that driving shafts (not shown) of the video tape recorder are engaged with hub openings of the tape reels 3 through the insertion holes 5a and 5b when the cartridge case 1 is mounted in the video tape recorder. A pair of tape guide members 9 are provided on both sides in the front part of the cartridge case 1 for guiding the video tape 2, which is drawn out from one tape reel 3 along the front surface of the cartridge case 1 and wound around the other tape reel 3.

A front lid member 10 for covering the front surface of the cartridge case 1 is pivotally connected to the cartridge case 1 in a manner capable of being opened and closed.

The front lid member 10 is formed of plastic resin material, and comprises a front plate 11 for covering the cartridge case 1 longitudinally along the front surface thereof, a pair of connecting members 12a and 12b rearwardly projecting from both sides of the front plate 11 and a pair of pivotal shafts 13a and 13b inwardly projecting from the connecting members 12a and 12b to be opposite to each other. The connecting members 12a and 12b are engaged in stepped wall members 15c and 15d defined in front portions of a pair of side walls 15a and 15b of the cartridge case 1 in a manner stepped inwardly of the side walls 15a and 15b while the pivotal shafts 13a and 13b are rotatably engaged in through-holes 16 formed through the stepped wall members 15c and 15d. Thus, the front lid member 10 is pivotally rotatable about the pivotal shafts 13a and 13b between a closed position for covering the front surface of the cartridge case 1 and an upwardly opened position.

As hereinafter described in detail, the front lid member 10 is urged by a torsion spring 17 to be in the closed position. When the video tape cartridge is not used, the front lid member 10 is closed to cover the cartridge case 1 and protect the recording surface of the video tape 2. When, in turn, the cartridge case 1 is mounted in the video tape recorder, the front lid member 10 is opened so that a tape loading pin (not shown) of the video tape recorder is inserted in a pocket member 19 formed in the front surface of the cartridge case 1 in a recessed manner for drawing out the video tape 2 frontwardly along the cartridge case 1.

A substantially square-shaped recess 29 is formed in the lower end portion of the front plate 11 of the front lid member 10 in the right-hand direction while a clearance 20 communicating with the recess 29 is defined between the stepped wall member 15d of the right-hand side wall 15b and the right-hand connecting member 12b of the front lid member 10 to contain a member for locking the front lid member 10 in the closed position when the video tape cartridge is not used.

Figure 4:
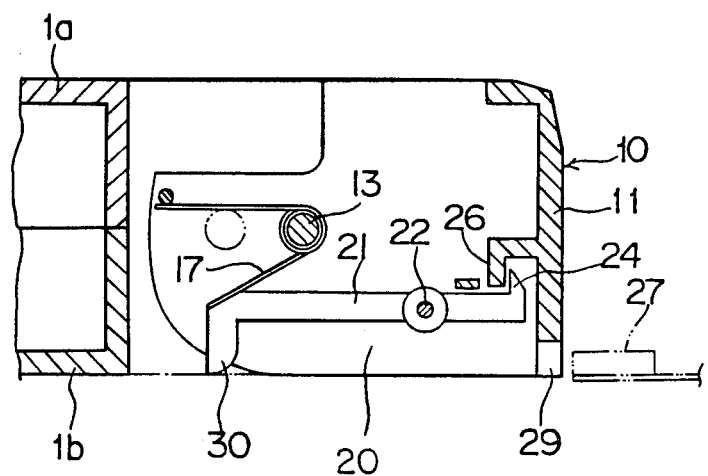
FIG. 4 is a cross sectional view taken along the line A—A in FIG. 3.

FIGS. 3 and 4 the said means for locking the front lid member 10 in the closed position. The stepped wall member 15d is slanted frontwardly toward the interior of the cartridge case 1 in top plan view, so that the clearance 20 extends frontwardly to have its rear portion narrowed and front portion widened. A locking member 21 is arranged within the clearance 20.

The locking member 21 has a shaft 22 laterally projecting from the longitudinal center thereof, which is engagedly and rotatably supported by a bearing opening 23 defined through the stepped wall member 15d so that a forward engaging portion 24 of the locking member 21 is vertically rotated about the shaft 22. An L-shaped engaging member 26 is downwardly projectingly formed in the inner surface of the front plate 11, and an end of the torsion spring 17 is brought into contact with the rear end portion of the locking member 21 to urge the same such that the front engaging portion 24 thereof is engaged, from below, with the engaging member 26. When the video tape cartridge is not used, thus, the front engaging portion 24 of the locking member 21 is continuously engaged with the engaging member 26 of the front lid member 10, which is in the closed position, to prevent the front lid member 10 from being rotated about the pivotal shafts 13 toward the opened position. On the other hand, when the video tape cartridge is mounted in a video tape recorder in a proper condition, a locking release member 27 provided in the video tape recorder, which also functions to prevent erroneous mounting of the video tape cartridge, is relatively guided from the front direction to enter the clearance 20 through an opening 29 recessedly formed through the lower end of the front plate 11 to press a pressed member 30 downwardly projectingly formed in the rear end of the locking member 21. Thus, the forward engaging portion 24 of the locking member 21 is downwardly moved against the torsion spring 17 to be disengaged from the engaging member 26, thereby releasing the front lid member 10 from the closed condition.

Since the clearance 20 is widened toward the forward end portion and narrowed toward the rear end portion, even if the video tape cartridge is mounted in the video tape recorder in a laterally deviating condition, the locking release member 27 is smoothly guided in the clearance 20, and is properly brought into contact with the pressed member 30 of the locking member 21. When the video tape cartridge is mounted in the video tape recorder in a laterally or vertically inverted condition, the locking release member 27 is not coincident with the opening 29 and is brought into contact with a portion other than the same, thereby preventing erroneous mounting of the video tape cartridge.

Since the stepped wall member 15d of the left-hand side wall 15 has its inner surface 16a frontwardly slanted, in top plan view, toward the interior of the cartridge case 1, the magnetic recording tape 2 brought into contact with the inner surface 16a contingently in a condition loosened between the tape guide members 9 is effectively drawn in the interior of the cartridge case 1 and prevented from being loosened along the front surface of the cartridge case 1.

As hereinabove described, the video tape cartridge shown in the embodiment of the present invention is so formed that the clearance 20 defined between the side wall 15 of the cartridge case 1 which receives the locking member 21 for the front lid member 10 and the side portion 12 of the front lid member 10 is stepped to have a wide front portion 20a and a narrow rear portion 20b. Therefore, even if the video tape cartridge slightly deviates in either left-hand or right-hand direction when being mounted in the video tape recorder, the locking release member 27 of the video tape recorder can be easily inserted in the clearance 20 having the wide entrance through the recess 29 of the front lid member 10. Upon such insertion in the clearance 20, the locking release member 27 is effectively guided toward the narrow rear portion 21b of the clearance to be properly in contact with the pressed portion 30 of the locking member 26. Thus, the present invention is particularly effective in a small-sized recording tape cartridge which bears merely a small space in design for the clearance 20.

What is claimed is:

1. A recording tape cartridge comprising:
   a cartridge case having a front wall, side walls and top and bottom walls for defining a chamber for accommodating a recording tape wound around a tape reel means;
   a lid member having a flat front plate and a pair of connecting plates projecting from said flat front plate, said lid member being rotatably mounted on said cartridge case with said connecting plates opposed to said respective side walls so as to rotate said flat front plate between a closed position and an opened position;
   an opening defined on a bottom portion of said flat front plate of said lid member;
   clearance means of variable width having a front end defined between one of said side walls and corresponding connecting plate of said lid member, said front end of said clearance means being connected with said opening of said lid member, said width of said clearance means being wider in its front portion than in its rear portion; and
   lid locking means provided in said clearance means for locking said lid member in a closed position, said locking means being operated by a locking release member of a recording device which enters inside said clearance means through said opening for releasing the locking condition of said lid member to open same.

* * * * *